United States Patent
Pinceloup et al.

(10) Patent No.: US 7,172,985 B2
(45) Date of Patent: Feb. 6, 2007

(54) DIELECTRIC CERAMIC CAPACITOR COMPRISING NON-REDUCIBLE DIELECTRIC

(75) Inventors: Pascal G. Pinceloup, Simpsonville, SC (US); James J. Beeson, Simpsonville, SC (US)

(73) Assignee: Kemet Electronics Corporation, Greenville, SC (US)

( * ) Notice: Subject to any disclaimer, the term of this patent is extended or adjusted under 35 U.S.C. 154(b) by 98 days.

(21) Appl. No.: 11/146,847

(22) Filed: Jun. 7, 2005

(65) Prior Publication Data

US 2006/0276325 A1    Dec. 7, 2006

(51) Int. Cl.
*C04B 35/465*    (2006.01)
*C04B 35/47*    (2006.01)

(52) U.S. Cl. .................... 501/135; 501/136; 361/321.4

(58) Field of Classification Search ................ 501/135, 501/136; 361/321.4
See application file for complete search history.

(56) References Cited

U.S. PATENT DOCUMENTS

| | | | |
|---|---|---|---|
| 4,223,369 A | 9/1980 | Burn | 361/321 |
| 4,607,018 A | 8/1986 | Nishioka et al. | 501/135 |
| 5,204,301 A | 4/1993 | Ohkubo et al. | 501/136 |
| 6,118,648 A | 9/2000 | Kojima et al. | 361/311 |
| 6,243,254 B1 | 6/2001 | Wada et al. | 361/311 |
| 6,295,196 B1 | 9/2001 | Hamaji et al. | 361/321.2 |
| 6,329,311 B1 | 12/2001 | Fujii et al. | 501/136 |
| 6,396,680 B1 | 5/2002 | Nishiyama et al. | 361/311 |
| 6,396,681 B2 | 5/2002 | Naito et al. | 361/321.4 |
| 6,407,024 B1 | 6/2002 | Satoh et al. | 501/137 |
| 6,487,065 B1 | 11/2002 | Nishino et al. | 361/321.2 |
| 6,617,273 B2 * | 9/2003 | Motoki et al. | 501/136 |
| 6,631,070 B2 | 10/2003 | Schmidt et al. | 361/321.2 |
| 6,649,554 B1 | 11/2003 | Chang et al. | 501/137 |
| 6,673,274 B2 | 1/2004 | Venigalla et al. | 252/570 |
| 6,790,801 B2 * | 9/2004 | Kim et al. | 501/136 |
| 2006/0126266 A1 * | 6/2006 | Jain et al. | 361/303 |

OTHER PUBLICATIONS

Reliability And Application Of Low Fired Multilayer Capacitor Having Copper Inner Electrode, Yasunobu et al., 1997 CARTS Europe.
Newly Developed Ternary (Ca, Sr, Ba) Zirconate Ceramic System For Microwave Resonators, *Ferroelecttics*, 1980, vol. 27, pp. 273-276, Yamaguchi et al.

* cited by examiner

*Primary Examiner*—Karl Group
(74) *Attorney, Agent, or Firm*—Joseph T. Guy; Nexsen Pruet, LLC

(57) ABSTRACT

A dielectric ceramic, and capacitor with the ceramic, wherein the ceramic has: about 94–99.9 wt % a first component defined by Formula 1;

$$[(Ca_{1-x}Sr_x)O]_m(Zr_{1-y}Ti_y)O_2 \quad \text{Formula 1}$$

wherein:
x is no more than about 0.6; and
y is no more than about 0.1; and
m is at least about 0.85 to no more than about 1.15; and
about 0.1–5 wt % a secondary component defined by Formula 2;

$$aSiO_2\text{-}b[\alpha B_2O_3\text{-}(1-\alpha)Li_2O]\text{-}cAO \quad \text{Formula 2}$$

wherein:
a, b and c are selected to lie within the region defined by points A(a=15, b=0, c=85), B(a=70, b=0, c=30), C(a=0, b=70, c=30) and D(a=0, b=15, c=85) of a ternary diagram wherein a is mole percent SiO2; b is mole percent $\alpha B_2O_3$-$(1-\alpha)Li_2O$; and c is mole percent AO and a+b+c=100 including the lines BC, CD and AD but excluding the line AB;
α is 0 to 1;
A is selected from Mg, Ca, Sr, Ba or a combination thereof; and
0–2 wt % $MnO_2$.

41 Claims, 2 Drawing Sheets

DIELECTRIC CERAMIC CAPACITOR COMPRISING NON-REDUCIBLE DIELECTRIC

BACKGROUND OF THE INVENTION

The present invention relates to a dielectric ceramic capacitor comprising alternating layers of electrodes and ceramic wherein the ceramic comprises calcium zirconium compounds in a main component.

Ceramic capacitors are known to comprise alternating layers of inner electrodes and ceramic dielectric. There has been, and continues to be, a desire to lower the cost of capacitors without sacrificing the quality. There has also been, and continues to be, a desire to lower the size of capacitors without sacrificing either the quality or capacitance. These desires are often at odds leading those of skill in the art towards continual efforts to advance the art of capacitors and the manufacture thereof.

One advance is the use of nickel as the electrode metal. Nickel has advantages in that the cost is low compared to noble metals such as silver and palladium and the resistance properties are suitable for use in a capacitor. One disadvantage with nickel is the propensity to oxidize under those conditions required to sinter the ceramic dielectric. The problem associated with oxidation has been mitigated by sintering the ceramic in reducing atmosphere thereby insuring that the metal remains in the metallic state. Unfortunately, ceramics sintered in reducing atmosphere have a lower specific resistance which is highly undesirable. This has led to an ongoing effort to develop non-reducible dielectric ceramics which can be sintered in a reducing atmosphere below the melting temperature of nickel.

Towards this goal diligent efforts have led to the development of a non-reducible ceramic which can be sintered in reducing atmosphere without detriment to the electrode thereby yielding a capacitor with high electrode continuity and excellent electrical properties.

SUMMARY OF THE INVENTION

It is an object of the present invention to provide a capacitor with improved properties.

It is another object of the present invention to provide a capacitor with a nickel electrode having excellent electrode continuity.

It is yet another object of the present invention to provide a ceramic which can be fired in reducing atmosphere without loss of resistance.

It is another object of the present invention to provide a capacitor with an improved ceramic dielectric.

A particular feature of the present invention is the ability to sinter the ceramic in reducing atmosphere while maintaining a sufficiently high specific resistance for the dielectric.

A particular advantage of the present invention is the ability to sinter the ceramic in reducing atmosphere at below 1400° C.

These and other advantages, as will be realized, are provided in a dielectric ceramic comprising:
about 94–99.9 wt % of a first component defined by Formula 1;

$$[(Ca_{1-x}Sr_x)O]_m(Zr_{1-y}Ti_y)O_2 \qquad \text{Formula 1}$$

wherein:
x is no more than about 0.6; and
y is no more than about 0.1; and
m is at least about 0.85 to no more than about 1.15; and
about 0.1–5 wt % of a secondary component defined by Formula 2;

$$aSiO_2\text{-}b[\alpha B_2O_3\text{-}(1-\alpha)Li_2O]\text{-}cAO \qquad \text{Formula 2}$$

wherein:
a, b and c are selected to lie within the region defined by points A(a=15, b=0, c=85), B(a=70, b=0, c=30), C(a=0, b=70, c=30) and D(a=0, b=15, c=85) of a ternary diagram wherein a is mole percent $SiO_2$; b is mole percent $\alpha B_2O_3\text{-}(1-\alpha)Li_2O$; and c is mole percent AO and a+b+c=100 including the lines BC, CD and AD but excluding the line AB;
$\alpha$ is 0 to 1;
A is selected from Mg, Ca, Sr, Ba or a combination thereof; and
0–2 wt % $MnO_2$.

Yet another embodiment is provided in a laminated ceramic capacitor with a plurality of inner electrode layers, a plurality of dielectric layers between the inner electrode layers and external electrodes in electrical conductivity with the inner electrode layers. The dielectric layers have a ceramic defined as:
about 94–99.9 wt % of a first component defined by Formula 1;

$$[(Ca_{1-x}Sr_x)O]_m(Zr_{1-y}Ti_y)O_2 \qquad \text{Formula 1}$$

wherein:
x is no more than about 0.6; and
y is no more than about 0.1; and
m is at least about 0.85 to no more than about 1.15; and
about 0.1–5 wt % of a secondary component defined by Formula 2;

$$aSiO_2\text{-}b[\alpha B_2O_3\text{-}(1-\alpha)Li_2O]\text{-}cAO \qquad \text{Formula 2}$$

wherein:
a, b and c are selected to lie within the region defined by points A(a=15, b=0, c=85), B(a=70, b=0, c=30), C(a=0, b=70, c=30) and D(a=0, b=15, c=85) of a ternary diagram wherein a is mole percent SiO2; b is mole percent $\alpha B_2O_3\text{-}(1-\alpha)Li_2O$; and c is mole percent AO and a+b+c=100 including the lines BC, CD and AD but excluding the line AB;
$\alpha$ is 0 to 1;
A is selected from Mg, Ca, Sr, Ba or a combination thereof; and
0–2 wt % $MnO_2$.

Yet another embodiment is provided in a dielectric ceramic with:
about 95–99.5 wt % of a first component defined by Formula 1;

$$[(Ca_{1-x}Sr_x)O]_m(Zr_{1-y}Ti_y)O_2 \qquad \text{Formula 1}$$

wherein:
x is no more than about 0.6; and
y is no more than about 0.1; and
m is at least about 0.85 to no more than about 1.15; and
about 0.35 to about 4 wt % of a secondary component defined by Formula 2;

$$aSiO_2\text{-}b[\alpha B_2O_3\text{-}(1-\alpha)Li_2O]\text{-}cAO \qquad \text{Formula 2}$$

wherein:

a, b and c are selected to lie within the region defined by points A(a=15, b=0, c=85), B(a=70, b=0, c=30), C(a=0, b=70, c=30) and D(a=0, b=15, c=85) of a ternary diagram wherein a is mole percent SiO2; b is mole percent $\alpha B_2O_3$-(1-$\alpha$)Li$_2$O; and c is mole percent AO and a+b+c=100 including the lines BC, CD and AD but excluding the line AB;

$\alpha$ is 0 to 1;

A is selected from Mg, Ca, Sr, Ba or a combination thereof; and about 0.2 to about 1.5 wt % MnO$_2$.

BRIEF DESCRIPTIONS OF THE DRAWINGS

DETAILED DESCRIPTION OF THE INVENTION

The invention will be described with reference to the accompanying drawings forming an integral part of the present disclosure.

Figure 1:
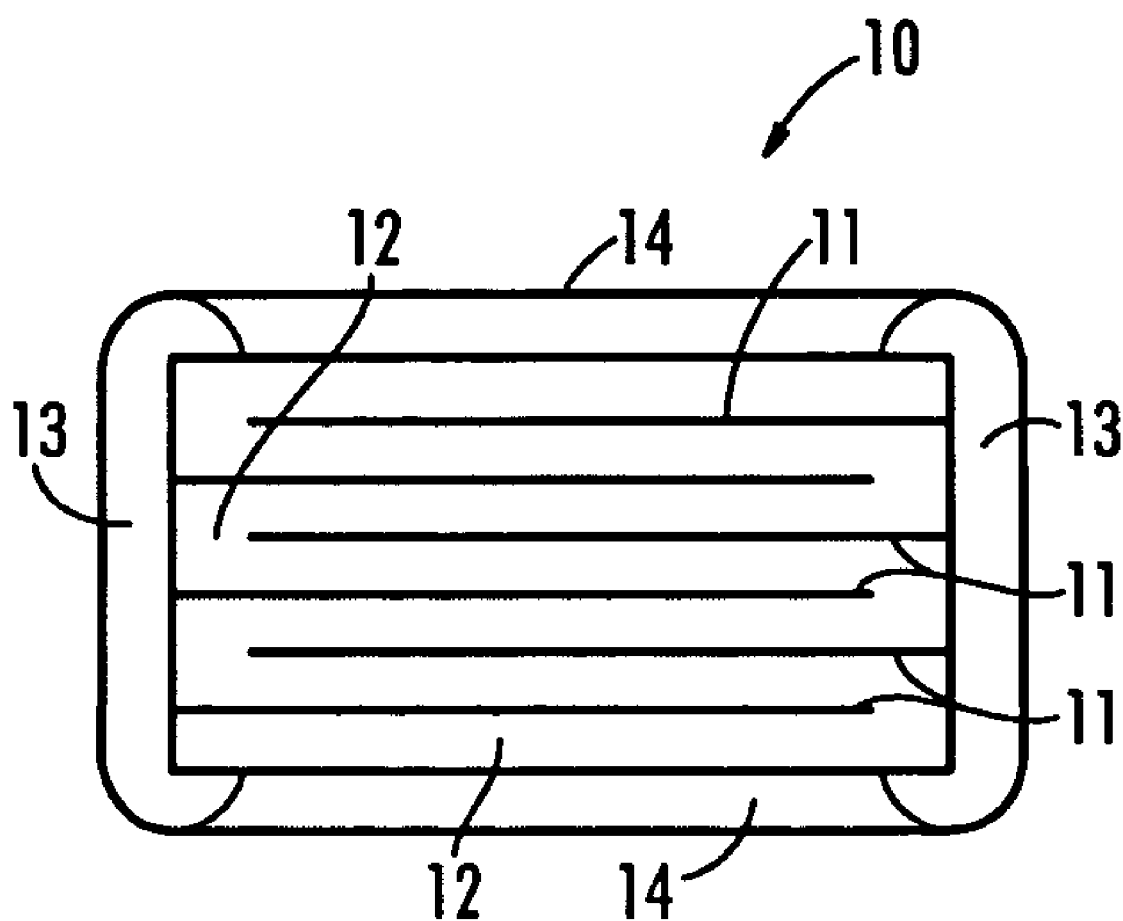
FIG. 1 is a cross-sectional view of a capacitor of the present invention.

A cross-sectional view of a capacitor of the present invention is illustrated schematically in FIG. 1. In FIG. 1, the capacitor, generally represented at 10, comprises a multiplicity of conductive inner electrodes, 11, with ceramic, 12, dispersed there between. Alternating layers of the conductive layer terminate at opposing external terminals, 13, of opposite polarity. An insulating layer, 14, may be applied.

The dielectric ceramic layers, 12, are composed of a dielectric ceramic composition comprising a primary component defined by Formula 1.

$$[(Ca_{1-x}Sr_x)O]_m(Zr_{1-y}Ti_y)O_2 \quad \text{Formula 1}$$

wherein: x is no more than 0.6, y is no more than 0.1, and m is at least 0.85 to no more than 1.15. When x is above about 0.6 the temperature coefficient of capacitance becomes too large. When y is above about 0.1 the temperature coefficient of capacitance is not acceptable, the quality factor Q is lower and the ceramic becomes more sensitive to reduction.

More preferably x, in formula 1 is at least 0.1 and no more than about 0.5. Even more preferably x, in formula 1, is at least about 0.2 to no more than about 0.4.

More preferably y, in formula 1 is at least about 0.01 and no more than about 0.07. Even more preferably y, in formula 1, is at least about 0.02 to no more than about 0.05.

In addition to the primary component the dielectric ceramic composition comprises a secondary component defined by formula 2:

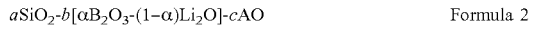

$$aSiO_2\text{-}b[\alpha B_2O_3\text{-}(1-\alpha)Li_2O]\text{-}cAO \quad \text{Formula 2}$$

wherein: a represents the molar percent of silicon dioxide, b represents the molar percent of boron oxide or lithium oxide or any combination thereof ($0 \leq \alpha \leq 1$), and c represents the molar percent of at least one alkaline earth oxide chosen among oxides of magnesium, calcium, strontium, barium and any combinations thereof. The SiO$_2$ content a, the (B$_2$O$_3$—Li$_2$O) content b, and the alkaline earth oxide content c in the secondary component preferably lie within the region surrounded by points A(a=15, b=0, c=85), B(a=70, b=0, c=30), C(a=0, b=70, c=30) and D(a=0, b=15, c=85) of the ternary diagram of FIG. 2 including the lines BC, CD and AD but excluding the line AB. The secondary component as defined by formula 2 can be added in a variety of forms, such as, a single phase compound, a multi-phase compound, or a mixture thereof, wherein each compound can be, but is not limited to: a glass powder, a single-element or a multi-element oxide, a carbonate, a pure element, a metal-organic compound, a metal alkoxide, a sol-gel derived powder, and any possible combination thereof leading after sintering to a secondary component of general formula aSiO$_2$-b[$\alpha$B$_2$O$_3$-(1-$\alpha$)Li$_2$O]-cAO.

Figure 2:
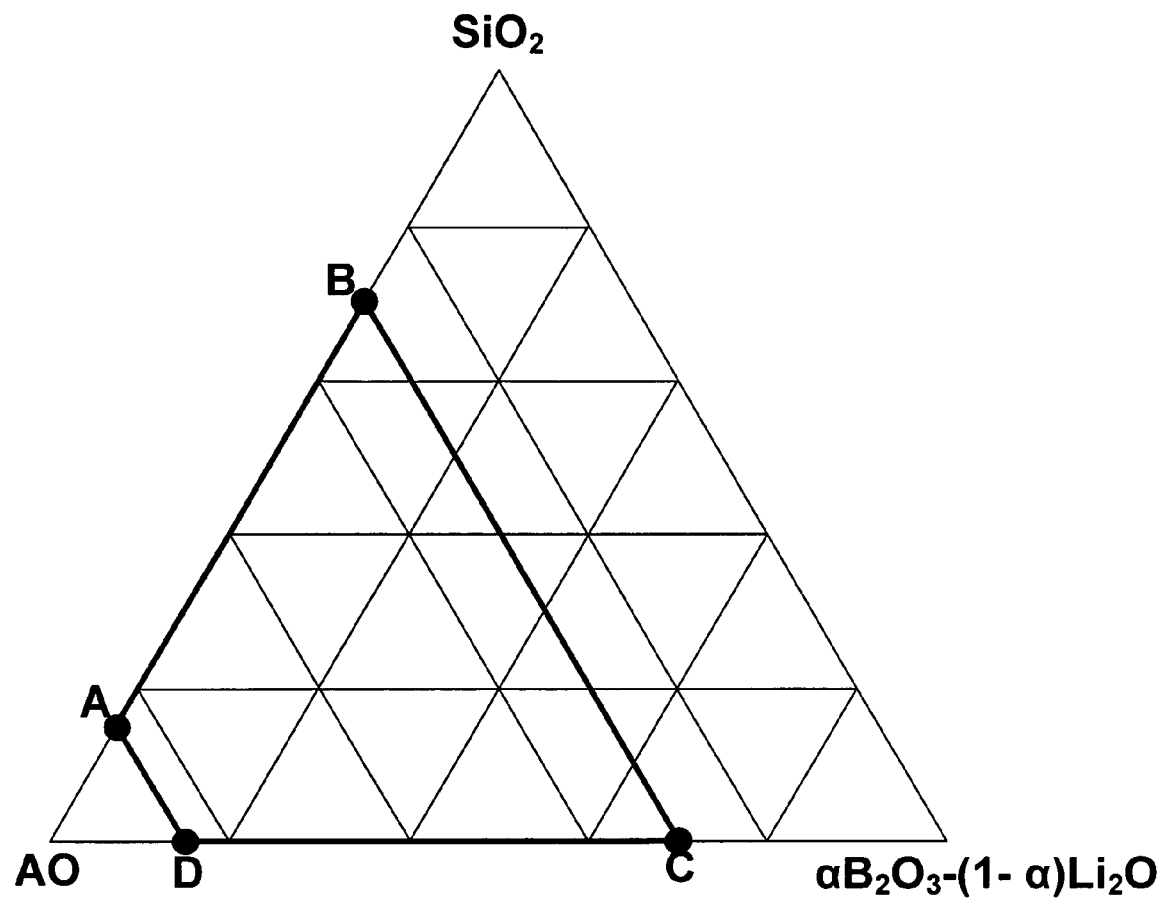
FIG. 2 is a ternary diagram of SiO$_2$, $\alpha B_2O_3$-(1-$\alpha$)Li$_2$O and AO.

Above a mole percent of silicon dioxide of about 70 mole %, indicated as outside of line BC in the ternary diagram of FIG. 2 and toward the SiO$_2$ pole (a>70), the sintering temperature increases. In a particularly preferred embodiment the mole percent of silicon dioxide, in formula 2 is about 20 to 30 mole %.

Above a mole percent of boron oxide-lithium oxide combination of about 70 mole %, indicated as outside of line BC of the ternary diagram of FIG. 2 and toward the B$_2$O$_3$—Li$_2$O pole (b>70), the physical properties of the ceramic are inferior. In a particularly preferred embodiment the mole percent of boron oxide and/or lithium oxide, in formula 2 is about 15 to 30 mole %.

Above a mole percent of AO of about 85 mole % (c>85) the sintering temperature increases too much. More preferably the mole percent of AO in formula 2 is at least about 40 mole % and no more than about 70 mole %. In a particularly preferred embodiment the mole percent of AO, in formula 2 is about 42 to 60 mole %.

The dielectric ceramic composition preferably comprises at least 94 wt % primary component to no more than 99.9 wt % primary component. Below about 94 wt % primary component the dielectric constant is too low. Above about 99.9 wt % primary component the sintering temperature increases too much. More preferably the primary component is present in an amount of at least about 95 wt % to no more than about 99.5 wt %. Even more preferably the primary component is present in an amount of at least about 96 wt % to no more than about 99 wt %.

The dielectric ceramic composition preferably comprises at least 0.1 wt % secondary component to no more than 5 wt % secondary component. Below about 0.1 wt % secondary component the densification is poor. Above about 5 wt % secondary component the dielectric constant is lowered unacceptably. More preferably the secondary component is present in an amount of at least about 0.35 wt % to no more than about 4 wt %. Even more preferably the secondary component is present in an amount of at least about 0.8 wt % to no more than about 2.5 wt %.

The dielectric ceramic composition may also comprise MnO$_2$ in an amount of up to 2 wt %. While not limited to any theory the MnO$_2$ is believed to improve sinterability and improve insulation resistance of the fired ceramic. It is more preferred that the MnO$_2$ be present in an amount of at least about 0.2 wt % to no more than about 1.5 wt %. Most preferably the MnO$_2$ is present in an amount of at least about 0.3 wt % to no more than about 1 wt %.

The dielectric of the present invention can be used to prepare a laminated ceramic capacitor with excellent insulation resistance, high reliability and which can be fired at below 1300° C. in reducing atmosphere without causing the ceramic to become semi-conductive. The resulting ceramic has a small temperature coefficient of capacitance (TCC) between −30 and +30 ppm/° C. in the temperature range of −55° C. to +125° C., meeting EIA C0G specification. Here TCC(t) where t is temperature in ° C. is defined by:

$TCC(t)=10^6 \times [Cap(t)-Cap(25)]/[Cap(25)\times(t-25)]$ where Cap(t) is the capacitance of the device at temperature t. The resulting ceramic also has a dielectric constant of about 35. Further advantages of the inventive ceramic includes a long accelerated lifetime of insulating resistance.

The primary component preferably has a mean particle size of about 0.5 to 1.0 µm.

The inner electrodes, 11, are composed of a base metal such as nickel, copper, chromium or an alloy thereof. Most preferably the base metal is nickel since the advantages of nickel can be fully exploited with the inventive ceramic.

The composition of the external end terminations, 13, is not particularly limiting herein and any composition typically employed in the art is sufficient. Silver, palladium, copper, nickel or alloys of these metals blended with various glass frits are particularly relevant. A plating layer or multiple plating layers can be formed on the external end terminations.

The preparation of laminated ceramic capacitors are well documented and the present invention does not alter the manufacturing process to any significant degree relative to standard procedures known in the art.

As an example of a manufacturing process, a ceramic slurry is prepared by blending and milling the ceramic compounds described herein with a dispersant in either water or an organic solvent such as, for example, ethanol, isopropanol, toluene, ethyl acetate, propyl acetate, butyl acetate or a blend thereof. After milling a ceramic slip is prepared for tape-casting by adding a binder and a plasticizer to control rheology and to give strength to the tape. The obtained slip is then processed into a thin sheet by tape-casting. After drying the sheet, a multiplicity of electrodes are patterned on the sheet by using, for example, a screen-printing method to form printed ceramic sheet.

A laminate green body is prepared by stacking onto a substance such as polycarbonate, polyester or a similar method: 1) a certain number of unprinted ceramic sheets representing the bottom covers, then 2) a certain number of printed ceramic sheets in alternate directions so as to create alternating electrodes that terminate at opposing ends, and 3) a certain number of unprinted ceramic sheets representing the top covers. Variations in the stacking order of the printed and unprinted sheets can be used with the dielectric material of this invention. The stack is then pressed at between 20° C. and 120° C. to promote adhesion of all laminated layers.

The laminated green body is then cut into individual green chips.

The green chip is heated to remove the binder. The binder can be removed by heating at about 200–400° C. in atmospheric air or slightly reducing atmosphere for about 0.5 to 48 hours.

The dielectric is then sintered in a reductive atmosphere with an oxygen partial pressure of $10^{-8}$ to $10^{-12}$ atm at a temperature not to exceed 1300° C. The preferred temperature is about 1,200 to 1,300° C. After sintering the dielectric is reoxidized by heating to a temperature of no more than about 1,100° C. at an oxygen partial pressure of about $10^{-5}$ to $10^{-10}$ atm. More preferably, the reoxidation is done at a temperature of about 800 to 1,100° C. The material resulting from this stage is typically referred to as a sintered chip.

The sintered chip is subjected to end surface grinding by barrel or sand blast, as known in the art, followed by transferring outer electrode paste to form the external electrodes. Further baking is then done to complete the formation of the outer electrodes. The further baking is typically done in nitrogen atmosphere at a temperature of about 600–1000° C. for about 0.1 to 1 hour.

Layers of nickel and tin can then be plated on the outer electrodes to enhance solderability and prevent oxidation of the outer electrodes.

EXAMPLES

A powder of $[(Ca_{1-x}Sr_x)O]_m(Zr_{1-y}Ti_y)O_2$ was used as the primary component in all the following examples. The powder was prepared by calcination from $CaCO_3$, $SrCO_3$, $ZrO_2$ and $TiO_2$ in ratios to achieve a composition with x=0.3, y=0.03 and m=1.000. The typical median particle size of the calcined powder was 0.7 µm and the specific surface area was 4.5 m²/g. Glass powders for the secondary components were obtained by mixing raw materials of $CaCO_3$, $SrCO_3$, $SiO_2$ and $B_2O_3$, melting, quenching and milling. Table 1 gives the formulation of the glass powders used.

TABLE 1

| Glass Powder No. | SiO2 (mol %) | B2O3 (mol %) | CaO (mol %) | SrO (mol %) |
|---|---|---|---|---|
| A | 30 | 20 | 50 | 0 |
| B | 30 | 20 | 35 | 15 |
| C | 30 | 20 | 20 | 30 |

Ceramic formulations were prepared by mixing and milling mixtures of the primary component, a secondary component (glass powder+additive) and manganese dioxide in water with a binder and plasticizer in order to prepare ceramic slurries. Table 2 and 3 give the ceramic formulations prepared with this process. Table 2 gives the actual wt % of each material used and the mean particle size (D50) of the ceramic slurry after milling. Table 3 gives the resulting compositions of the secondary component only (glass+additive $CaCO_3$ and $SrCO_3$), after conversion of the carbonates into oxides.

TABLE 2

| Sample No. | Primary Component wt % | Glass Powder | Glass Powder wt % | CaCO3 additive wt % | SrCO3 additive wt % | MnO2 wt % | D50 After Milling (µm) |
|---|---|---|---|---|---|---|---|
| 1 | 99 | A | 0.5 | 0 | 0 | 0.5 | 0.65 |
| 2 | 97.7 | A | 1.2 | 0 | 0.6 | 0.5 | 0.63 |
| 3 | 97.7 | A | 1.2 | 0 | 0.6 | 0.5 | 0.63 |
| 4 | 96.675 | A | 1.2 | 0 | 1.625 | 0.5 | 0.64 |
| 5 | 98 | A | 1.5 | 0 | 0 | 0.5 | 0.62 |
| 6 | 97.262 | A | 1.5 | 0 | 0.738 | 0.5 | 0.64 |
| 7 | 96.56 | A | 2 | 0 | 0.639 | 0.8 | 0.64 |
| 8 | 95.9 | A | 2.5 | 0 | 0.799 | 0.8 | 0.68 |
| 9 | 97.511 | B | 1.2 | 0.787 | 0.001 | 0.5 | 0.66 |

TABLE 2-continued

| Sample No. | Primary Component wt % | Glass Powder | Glass Powder wt % | CaCO₃ additive wt % | SrCO₃ additive wt % | MnO₂ wt % | D50 After Milling (μm) |
|---|---|---|---|---|---|---|---|
| 10 | 96.818 | B | 2 | 0.417 | 0.264 | 0.5 | 0.65 |
| 11 | 96.318 | B | 2 | 0.417 | 0.264 | 1 | 0.63 |
| 12 | 97.398 | C | 1.2 | 0.865 | 0.035 | 0.5 | 0.64 |

TABLE 3

| | Secondary Component Composition | | | |
|---|---|---|---|---|
| Sample No. | $SiO_2$ (mol %) | $B_2O_3$ (mol %) | CaO (mol %) | SrO (mol %) |
| 1 | 30.0 | 20.0 | 50.0 | 0 |
| 2 | 24.9 | 16.6 | 41.6 | 16.9 |
| 3 | 24.9 | 16.6 | 41.6 | 16.9 |
| 4 | 19.4 | 12.9 | 32.3 | 35.4 |
| 5 | 30.0 | 20.0 | 50.0 | 0 |
| 6 | 25.0 | 16.7 | 41.6 | 16.7 |
| 7 | 26.6 | 17.7 | 44.2 | 11.5 |
| 8 | 26.6 | 17.7 | 44.2 | 11.5 |
| 9 | 20.8 | 13.9 | 54.8 | 10.5 |
| 10 | 25.0 | 16.7 | 40.8 | 17.5 |
| 11 | 25.0 | 16.7 | 40.8 | 17.5 |
| 12 | 19.4 | 12.9 | 47.4 | 20.3 |

Next, the ceramic slurries were formed into sheets by the doctor blade method. The thickness of the sheet was controlled to obtain dielectric thicknesses of about 6 μm after firing. A conductive paste primarily composed of nickel was then applied on the ceramic green sheet by screen-printing so as to form the internal electrodes of a monolithic ceramic capacitor. A multiplicity of ceramic green sheets with conductive paste were then laminated to form a green multilayer laminate. Lamination was performed so that in the final multilayer capacitor the electrodes are exposed alternately on both ends. The laminate thus formed was then cut to desired dimensions and heated to between 200 and 400 °C. in atmospheric air or slightly reducing atmosphere to burn out the organic components of the green laminate. Subsequently, the laminate was sintered at a temperature shown in Table 4 in a reducing atmosphere of $N_2$—$H_2H_2O$ to form a sintered ceramic body. A copper paste was then applied to both ends of the sintered body to form external electrodes electrically connected to the internal nickel electrodes. The outer dimensions of the finished multilayer ceramic capacitors were 2.0mm in length by 1.25mm in width by 1.25mm in thickness. The thickness and number of dielectric layers were 6μm and 73 respectively.

The electrical properties of the capacitors were then determined. Electrostatic capacitance and Dissipation Factor were measured at 1 V, a frequency of 1 MHz and a temperature of 25° C. The average capacitance was about 3800pF. The relative dielectric constant was calculated from the electrostatic capacitance, the dimensions of the internal electrodes and the dielectric thickness. Insulation resistance was measured at 125° C. by applying a voltage of 50V with a charging time of 60 seconds. The temperature coefficient of capacitance (TCC) was calculated based on capacitance measurements at −55° C., +25° C. and +125° C. TCC(t) at a temperature t was calculated (in ppm/° C.) using the following equation: $TCC(t)=10^6 \times [Cap(t)-Cap(25)]/[Cap(25) \times (t-25)]$ where Cap(t) is the capacitance of the capacitor at temperature t, in ° C. Finally, highly accelerated life test (HALT) was performed on 20 capacitors by monitoring the insulation resistance at a temperature of 175° C. and a voltage of 400V during 92 h. Median Time To Failure (MTTF) are reported in minutes. If more than 50% of the capacitors in a sample did not fail at 92 h, the MTTF is reported as >5520 min. The results of the electrical characterization are summarized in Table 4.

TABLE 4

| Sample No. | D50 After Milling (μm) | Peak Firing Temperature (° C.) | Dielectric Constant K | Dissipation Factor (%) | Insulation resistance at 125° C./ 50 V (G ohms) | Breakdown Voltage (V) | TCC at −55° C. | TCC at +125° C. | MTTF (min) |
|---|---|---|---|---|---|---|---|---|---|
| 1 | 0.65 | 1225 | 30.7 | 0.007 | 1269 | 649 | −23.1 | −1.9 | >5520 |
| 2 | 0.63 | 1200 | 30.8 | 0.008 | 1009 | 907 | −20.1 | −0.7 | >5520 |
| 3 | 0.63 | 1250 | 33.3 | 0.009 | 2052 | 945 | −23.1 | −2.4 | >5520 |
| 4 | 0.64 | 1225 | 33.6 | 0.010 | 270 | 745 | −25.3 | 0.6 | >5520 |
| 5 | 0.62 | 1200 | 31.0 | 0.012 | 2416 | 986 | −19.6 | 1.4 | 3870 |
| 6 | 0.64 | 1250 | 32.2 | 0.008 | 2262 | 742 | −21.8 | −1.2 | >5520 |
| 7 | 0.64 | 1250 | 33.3 | 0.010 | 2990 | 824 | −15.6 | 4.3 | >5520 |
| 8 | 0.68 | 1250 | 28.7 | 0.013 | 3123 | 888 | −13.7 | 5.9 | 3533 |
| 9 | 0.66 | 1225 | 30.5 | 0.009 | 345 | 597 | −23.1 | −0.1 | >5520 |
| 10 | 0.65 | 1250 | 32.8 | 0.010 | 3236 | 672 | −22.3 | −1.0 | >5520 |
| 11 | 0.63 | 1250 | 32.5 | 0.009 | 324 | 789 | −15.7 | 2.8 | >5520 |
| 12 | 0.64 | 1225 | 33.2 | 0.009 | 202 | 503 | −25.0 | −2.1 | >5520 |

In conclusion, samples 1 through 12 have high insulation resistance above 200 GΩ at 125° C., a dissipation factor less than 0.1%, high breakdown voltage and a TCC in the range −32.3 to −13.7 ppm/° C. at −55° C. and in the range −6.4 to 5.9 ppm/° C. at +125° C. when fired at or below 1300° C. in reducing conditions compatible with Ni electrodes. The average median time to failure in a highly accelerated life test at 175° C., 400V is greater than 92 h.

The invention has been described with particular emphasis on the preferred embodiments without limit thereto. One of skill in the art would realize from the teachings herein alternate embodiments which are within the metes and bounds of the claims appended hereto.

The invention claimed is:
1. A dielectric ceramic comprising:
about 94–99.9 wt % a first component defined by Formula 1;

$$[(Ca_{1-x}Sr_x)O]_m(Zr_{1-y}Ti_y)O_2 \qquad \text{Formula 1}$$

wherein:
x is no more than about 0.6; and
y is no more than about 0.1; and
m is at least about 0.85 to no more than about 1.15; and
about 0.1–5 wt % a secondary component defined by Formula 2;

$$aSiO_2\text{-}b[\alpha B_2O_3\text{-}(1-\alpha)Li_2O]\text{-}cAO \qquad \text{Formula 2}$$

wherein:
a, b and c are selected to lie within the region defined by points A(a=15, b=0, c=85), B(a=70, b=0, c=30), C(a=0, b=70, c=30) and D(a=0, b=15, c=85) of a ternary diagram wherein a is mole percent SiO2; b is mole percent $\alpha B_2O_3$-$(1-\alpha)Li_2O$; and c is mole percent AO and a+b+c=100 including the lines BC, CD and AD but excluding the line AB;
α is 0 to 1;
A is selected from Mg, Ca, Sr, Ba or a combination thereof; and
0–2 wt % $MnO_2$.
2. The dielectric ceramic of claim 1 comprising about 95 to about 99.5 wt % of said first component.
3. The dielectric ceramic of claim 2 comprising about 96 to about 99 wt % of said first component.
4. The dielectric ceramic of claim 1 comprising about 0.35 to about 4 wt % of said second component.
5. The dielectric ceramic of claim 4 comprising about 0.8 to about 2.5 wt % of said secondary component.
6. The dielectric ceramic of claim 1 comprising about 0.2 to about 1.5 wt % $MnO_2$.
7. The dielectric ceramic of claim 6 comprising about 0.3 to about 1 wt % $MnO_2$.
8. The dielectric ceramic of claim 1 wherein x is at least about 0.1 to no more than about 0.5.
9. The dielectric ceramic of claim 8 wherein x is at least about 0.2 to no more than about 0.4.
10. The dielectric ceramic of claim 1 wherein y is about 0.01 to about 0.07.
11. The dielectric ceramic of claim 10 wherein y is about 0.02 to about 0.05.
12. The dielectric ceramic of claim 1 wherein a is about 20 to about 30.
13. The dielectric ceramic of claim 1 wherein b is about 15 to about 30.
14. The dielectric ceramic of claim 1 wherein c is about 40 to about 70.
15. The dielectric ceramic of claim 14 wherein c is about 42 to about 60.
16. A capacitor comprising a dielectric of claim 1.
17. A laminated ceramic capacitor comprising:
a plurality of inner electrode layers;
a plurality of dielectric layers between said inner electrode layers wherein said dielectric layers comprise a ceramic comprising:
about 94–99.9 wt % a first component defined by Formula 1;

$$[(Ca_{1-x}Sr_x)O]_m(Zr_{1-y}Ti_y)O_2 \qquad \text{Formula 1}$$

wherein:
x is no more than about 0.6; and
y is no more than about 0.1; and
m is at least about 0.85 to no more than about 1.15; and
about 0.1–5 wt % a secondary component defined by Formula 2;

$$aSiO_2\text{-}b[\alpha B_2O_3\text{-}(1-\alpha)Li_2O]\text{-}cAO \qquad \text{Formula 2}$$

wherein:
a, b and c are selected to lie within the region defined by points A(a=15, b=0, c=85), B(a=70, b=0, c=30), C(a=0, b=70, c=30) and D(a=0, b=15, c=85) of a ternary diagram wherein a is mole percent SiO2; b is mole percent $\alpha B_2O_3$-$(1-\alpha)Li_2O$; and c is mole percent AO and a+b+c=100 including the lines BC, CD and AD but excluding the line AB;
α is 0 to 1;
A is selected from Mg, Ca, Sr, Ba or a combination thereof;
and 0–2 wt % $MnO_2$;
and external electrodes in electrical conductivity with said inner electrode layers.
18. The dielectric ceramic of claim 17 comprising about 95 to about 99.5 wt % of said first component.
19. The dielectric ceramic of claim 18 comprising about 96 to about 99 wt % of said first component.
20. The laminated ceramic capacitor of claim 17 comprising about 0.35 to about 4 wt % of said secondary component.
21. The laminated ceramic capacitor of claim 17 wherein x is at least about 0.1 to no more than about 0.5.
22. The laminated ceramic capacitor of claim 21 wherein x is at least about 0.2 to no more than about 0.4.
23. The laminated ceramic capacitor of claim 17 wherein y is about 0.01 to about 0.07.
24. The laminated ceramic capacitor of claim 17 wherein y is about 0.02 to about 0.05.
25. The laminated ceramic capacitor of claim 17 wherein a is about 20 to about 30.
26. The laminated ceramic capacitor of claim 17 wherein b is about 15 to about 30.
27. The laminated ceramic capacitor of claim 17 wherein c is about 40 to about 70.
28. The laminated ceramic capacitor of claim 17 comprising about 0.2 to about 1.5 wt % $MnO_2$.
29. The laminated ceramic capacitor of claim 28 comprising about 0.3 to about 1 wt % $MnO_2$.
30. The laminated ceramic capacitor of claim 17 wherein said inner electrode layers comprise a metal.
31. The laminated ceramic capacitor of claim 17 wherein said metal is nickel.
32. A dielectric ceramic comprising:
about 95–99.5 wt % a first component defined by Formula 1;

$$[(Ca_{1-x}Sr_x)O]_m(Zr_{1-y}Ti_y)O_2 \qquad \text{Formula 1}$$

wherein:
x is no more than about 0.6; and
y is no more than about 0.1; and
m is at least about 0.85 to no more than about 1.15; and
about 0.1 to about 5.0 wt % a secondary component defined by Formula 2;

$$aSiO_2\text{-}b[\alpha B_2O_3\text{-}(1-\alpha)Li_2O]\text{-}cAO \qquad \text{Formula 2}$$

wherein:
a, b and c are selected to lie within the region defined by points A(a=15, b=0, c=85), B(a=70, b=0, c=30), C(a=0, b=70, c=30) and D(a=0, b=15, c=85) of a ternary diagram wherein a is mole percent SiO2; b is mole percent $\alpha B_2O_3$-$(1-\alpha)Li_2O$; and c is mole percent AO and a+b+c=100 including the lines BC, CD and AD but excluding the line AB;

$\alpha$ is 0 to 1;

A is selected from Mg, Ca, Sr, Ba or a combination thereof; and about 0 to about 2 wt % $MnO_2$.

33. The dielectric ceramic of claim 32 comprising about 96 to about 99 wt % of said first component.

34. The dielectric ceramic of claim 32 comprising about 0.35 to about 4 wt % of said secondary component.

35. The dielectric ceramic of claim 32 wherein x is at least about 0.1 to no more than about 0.5.

36. The dielectric ceramic of claim 35 wherein x is at least about 0.2 to no more than about 0.4.

37. The dielectric ceramic of claim 32 wherein y is 0.01 to 0.07.

38. The dielectric ceramic of claim 32 wherein a is about 20 to about 30.

39. The dielectric ceramic of claim 32 wherein b is about 15 to about 30.

40. The dielectric ceramic of claim 32 wherein c is about 40 to about 70.

41. A capacitor comprising the dielectric of claim 32.

* * * * *